United States Patent Office 3,197,274
Patented July 27, 1965

3,197,274
LIQUID-LIQUID RECOVERY OF METAL VALUES USING HYDROXYAMINE EXTRACTANTS
James M. White, Minneapolis, Minn., assignor to General Mills, Inc., a corporation of Delaware
No Drawing. Filed Mar. 5, 1962, Ser. No. 177,159
17 Claims. (Cl. 23—14.5)

This invention relates to the recovery of metal values from aqueous solutions and in particular to a liquid-liquid ion exchange extraction process employing certain hydroxyamine extractants.

It has been discovered that metal values can be extracted from aqueous solutions with certain aminohydroxyalkyl compounds described more fully hereinafter. Broadly, the process of the present invention comprises contacting a metal containing aqueous solution with a water immiscible organic phase containing the aminohydroxyalkyl compound whereby the metal values are preferentially extracted into the organic phase. The loaded organic phase is separated from the aqueous solution by virtue of their immiscibility. The metal values can then be stripped from the loaded organic phase by contacting it with water containing a stripping agent. The metal values can be recovered from the stripping solution by conventional means.

The aminohydroxyalkyl extractants have the general formula:

$$R-\left[\begin{array}{c}-CH-CH-\\ \ \ \ \ |\ \ \ \ \ \ |\\ Z-R^1-\ OH\ \ NHR^2\end{array}\right]$$

where Z is selected from the group consisting of

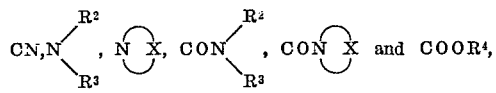 and $COOR^4$,

R is hydrogen or an aliphatic hydrocarbon radical of 1 to 20 carbon atoms, $R^1$ is a divalent aliphatic hydrocarbon radical of 1 to 21 carbon atoms, $R^2$ and $R^3$ are selected from the group consisting of hydrogen, aliphatic hydrocarbon radicals and aryl radicals, hydroxyalkyl radicals, aminoalkyl radicals, $R^4$ is selected from the group consisting of hydrogen, aliphatic radicals and aryl radicals and

is a nitrogen containing heterocyclic radical with X being the residue of said radical. R and $R^1$ are preferably aliphatic hydrocarbon radicals of 5 to 17 carbon atoms and the total number of carbon atoms in R and $R^1$ is in the range of 5 to 21, preferably 9 to 17. The above formula represents two groups of isomeric compounds which may be illustrated by the formulae:

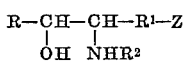

and

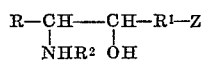

where R, $R^1$, $R^2$ and Z are as defined above. Hereinafter, the description will be restricted to one isomeric form; however, it will be understood that the description applies equally to both isomers.

As is apparent from the above description, the extractants of the present invention are nitriles, amides, amines, acids or esters which have either a primary or secondary amine group on the carbon alpha to the carbon bearing the hydroxyl group. I have found that it is essential that the said amine group be either primary or secondary. These compounds are prepared by somewhat different procedures but the starting materials in all cases may be unsaturated higher fatty acids, such as oleic, erucic, eleostearic, linoleic, linolenic, clupanodonic, palmitoleic, palmitolenic and the like. These even-carbon atom unsaturated fatty acids occur naturally in animal and vegetable fats and oils. Odd-carbon atom acids are found only rarely in nature. However, they can be synthesized by known methods and used to prepare the extractants.

The aminohydroxyalkyl nitriles are prepared by the reaction of an epoxy higher alkyl nitrile with ammonia or a primary amine to introduce a hydroxyl group on one of the epoxy carbon atoms and an amino group on the other. The epoxy higher alkyl nitriles may conveniently be obtained by the reaction of perbenzoic of peracetic acid with an unsaturated fatty nitrile. The unsaturated fatty nitriles may be prepared by reacting ammonia with the above-described unsaturated higher fatty acids.

The aminohydroxyalkyl amines may be prepared by hydrogenation of the corresponding aminohydroxy nitriles. A typical preparation of a 9-amino-10-hydroxystearonitrile and the corresponding amine from oleic acid can be illustrated as follows:

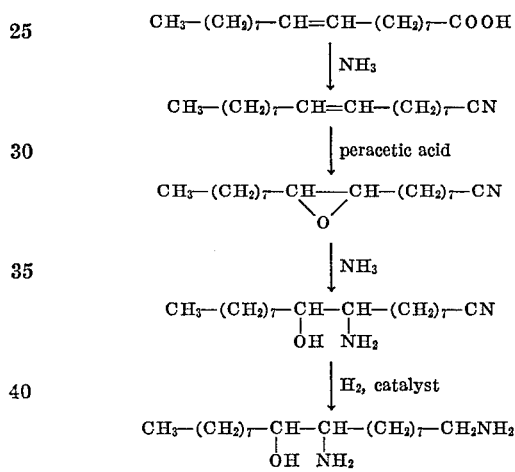

Substituted amine extractants can be prepared in the following manner:

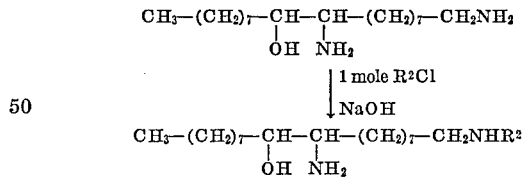

With 2 moles of $R^2Cl$, the following compound would result:

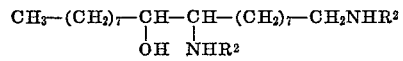

Substituted amines and nitriles can also be prepared by splitting the epoxy ring with a primary amine reactant:

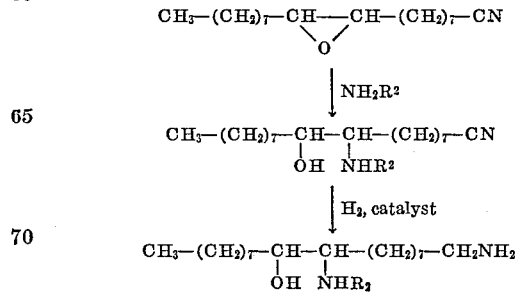

Aminoalkyl substituted amines and nitriles can be prepared in the following manner:

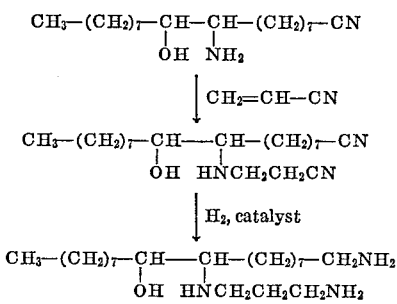

and similarly:

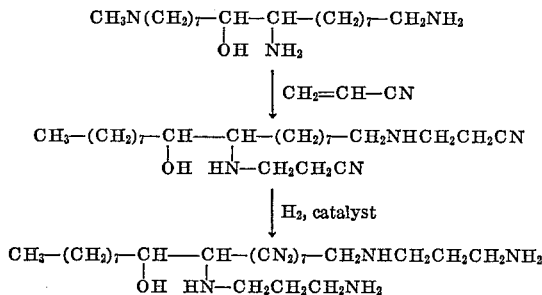

The aminohydroxyalkyl amides are prepared by reacting an unsaturated fatty acid with ammonia, a primary amine or a secondary amine to form the amide, epoxidizing the amide and then reacting the epoxy higher alkyl amide with ammonia or a primary amine to introduce a hydroxyl group on one of the epoxy carbon atoms and an amino group on the other. This preparation is illustrated by the following:

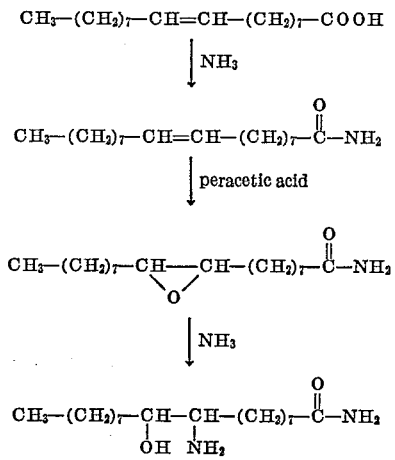

The substituents on the amide nitrogen are not critical and virtually all organic radicals are suitable. Reaction with ammonia gives an unsubstituted amide while reaction with primary and secondary amines give mono-substituted and disubstituted amides, respectively. Representative primary and secondary amines are methyl amine, dimethyl amine, ethyl amine, diethyl amine, methylethyl amine, butyl amine, dibutyl amine, hexyl amine, methylhexyl amine, dioctyl amine, dodecyl amine, methyldodecyl amine, stearyl amine, methylstearyl amine, distearyl amine, N-methylcyclohexyl amine, cyclohexyl amine, aniline, N-methylaniline, morpholine and the like.

The aminohydroxyalkyl acids are prepared by epoxidizing unsaturated higher fatty acids and then splitting the epoxy group by reaction with ammonia or a primary amine. This procedure is illustrated in the following manner using oleic acid:

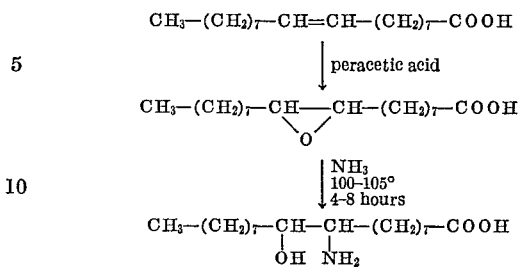

The esters can be prepared by reacting the aminohydroxyalkyl acids with a suitable alcohol or phenol under well known esterification conditions. The alcohols may be primary, secondary or tertiary and may be branched or straight chained. Ssubstituted alcohols and phenols are also suitable. Representative compounds are ethyl alcohol, butyl alcohol, dodecyl alcohol, phenol, cresol, ortho-chloro phenol and the like.

It will be readily apparent to those skilled in the art that a large number of aminohydroxyalkyl extractants can be prepared by reacting the epoxy compounds with ammonia or a primary amine. Such compounds as ethylene diamine, diethylene triamine, or other polyamines, monoethanolamine, aminophenols, substituted and unsubstituted alkyl and aryl amines are only representative of the many varieties of amine reactants which may be used to split the expoxy group to form the aminohydroxyalkyl extractants.

It is also apparent that the splitting of the epoxy ring in the above reaction schemes will produce a mixture of two isomers, since said ring may be split at either carbon to oxygen bond. Thus, preparation of the simple amine compound, for example, would result in the two isomers:

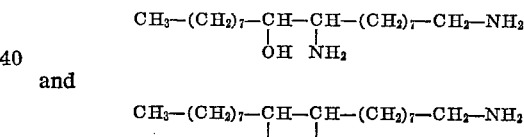

These compounds are 9-amino-10-hydroxystearylamine and 10-amino-9-hydroxystearylamine, respectively. Isomers of this type are conveniently referred to by an alternative nomenclature, e.g., 9(10)-amino-10(9)-hydroxystearylamine.

The various aminohydroxyalkyl amines and the preparation thereof are further described in the following copending applications: Rogier, Serial No. 852,937, filed Nov. 16, 1959; Rogier, Serial No. 77,295, filed Dec. 21, 1960; Rogier and Fulmer, Serial No. 107,942, filed May 5, 1961; and Rogier and Fulmer, Serial No. 111,931, filed May 23, 1961. The aminohydroxyalkyl nitriles and amides and the preparation thereof are further described in copending applications of Rogier, Serial No. 849,440, filed Oct. 29, 1959, and Serial No. 77,296, filed on Dec. 21, 1960, respectively. The preparation of the aminohydroxyalkyl acids is described in an article by Swern et al., J. Am. Chem. Soc., vol. 74, pages 6139–6141 (1952). These disclosures are incorporated herein by reference.

In addition to the above-described aminohydroxyalkyl compounds, the organic phase generally includes other materials, such as a conditioner, which typically is a long chain aliphatic alcohol such as capryl alcohol, isodecanol, tridecyl alcohol or 2-ethyl hexanol, and a diluent. Suitable diluents are aliphatic hydrocarbons, aromatic solvents, aromatic petroleum fractions, ketones, nitrohydrocarbons and chlorinated solvents. Examples of these solvents are: benzene, toluene, xylene, Skellysolve B, chloroform, fuel oil and kerosene. The composition of the organic phase is not critical. It is only necessary that the aminohydroxyalkyl compound be present in an amount sufficient to extract the metal values from the aqueous solutions. Generally, the extractant will be present in an amount of from about 2 to about 50% by weight based on the total organic phase. It is, however, preferred that the organic phase consist of from 5 to 15 weight percent of the aminohydroxyalkyl extractant, the remainder being the diluent. If the conditioner is present, it will be used in amounts of from about 2 to 10 weight percent.

The metal values may be stripped from the loaded organic phase by employing an aqueous solution of a suitable stripping agent. A particularly preferred stripping agent is ammonium hydroxide. Other such agents include mineral acids such as sulfuric acid, hydrochloric acid and the like.

The liquid-liquid extraction process of the present invention can be carried out on a single stage batch basis or in a continuous counter-current mixer-settler unit. The number of stages can be varied as desired, depending on the efficiency of extraction and stripping. By adjustment of the relative volumes of aqueous metal pregnant solution, organic phase and stripping solution introduced to the liquid-liquid extraction apparatus, it is possible to achieve a high degree of metal concentration.

The present process can be used advantageously to extract metal values from a wide variety of aqueous solutions. Said solutions are preferably basic but can be neutral or very slightly acidic.

A wide variety of metal values may be extracted by my process. Illustrative thereof are Al, Cr (III), Mn (II), Co (II), Ni (II), Cu (II), Zn (II), Fe (II), Fe (III), V (IV), Ti, Zr, Ce (IV), Mo, U (VI), U (IV) and the like. The process is particularly valuable for extraction of the values of the first and second transition series metals.

The invention is further described by the following examples. Said examples are illustrative only and do not constitute limitations on the invention.

EXAMPLES I–IV

Twenty-five milliliter portions of an aqueous feed solution containing 1.001 g./l. $Cu^{++}$ (as $CuCl_2$) were extracted with equal volumes of 0.126 molar solutions of various aminohydroxyalkyl compounds in kerosene or benzene. The extractions were performed on a single stage batch basis in separatory funnels at ambient room temperature. The organic solvent was first added to the funnels followed by addition of the aqueous feed solution. The funnels were shaken to equilibrate the mixtures and then the phases were allowed to separate. The amount of copper extracted was then determined. The results are set forth in the following Table I.

Table I

| Exp. | Extractant | Diluent | $Cu^{++}$ in Org. Phase (g./l.) | Percent Extraction |
|---|---|---|---|---|
| I | 9(10)-amino-10(9)-hydroxystearonitrile. | Benzene | 1.001 | 100 |
| II | 9(10)-dodecylamino-10(9)-hydroxystearonitrile. | do | 1.001 | 100 |
| III | 9(10)-amino-10(9)-hydroxystearamide. | do | 1.001 | 100 |
| IV | 9(10)-dodecylamino-10(9)-hydroxystearonitrile. | Kerosene | 0.67 | 67.0 |

The above data show that the process of the present invention using the aminohydroxyalkyl extractants is very valuable for the extraction of metal values such as Cu (II) from aqueous solutions.

EXAMPLES V–X

Extractions were performed in the same manner as described for Examples I–IV. However, the extractants were hydroxyamines in which the hydroxy group is alpha or beta to the carbon having the amine group and in which the amine group is tertiary. The results of these extractions are set forth in the following Table II.

Table II

| Exp. | Extractant | Diluent | $Cu^{++}$ in Org. Phase (g./l.) | Percent Extraction |
|---|---|---|---|---|
| V | 9(10)-di-n-hexylamino-10(9)-hydroxystearonitrile. | Kerosene | 0.021 | 2.05 |
| VI | 9(10)-di-n-butylamino-10(9)-hydroxystearonitrile. | do | 0.075 | 7.50 |
| VII | 2-hydroxydodecyl dinonylamine. | do | 0.037 | 3.66 |
| VIII | 2-phenyl-2-hydroxyethyl dicaprylamine. | do | 0.039 | 3.93 |
| IX | 2-phenyl-2-hydroxyethyl di(oleyl-linoleyl)amine. | do | 0.005 | 0.52 |
| X | 2-phenyl-2-hydroxyethyl dilaurylamine. | do | 0.072 | 7.15 |

The above data show that it is critical to have a primary or secondary amine group alpha to the carbon atom to which the hydroxyl group is attached.

EXAMPLES XI–XIX

Various portions of the aqueous feed solution used in the extractions of Examples I–X (i.e., 1.001 g./l. $Cu^{++}$ as $CuCl_2$) were extracted with kerosene solutions of 9(10)-dodecylamino - 10(9) - hydroxystearonitrile using the same procedure as set forth in the previous examples. However, the amine concentration and the aqueous: organic phase ratios were varied. The results of these extractions are set forth in Table III.

Table III

| Exp. | Vol. Aq. Phase (ml.) | Vol. Org. Phase (ml.) | Amine Concentration (Molar) | $Cu^{++}$ in Aq. After Extraction (g./l.) | Percent Extraction |
|---|---|---|---|---|---|
| XI | 25 | 25 | 0.3147 | 0.0969 | 90.32 |
| XII | 25 | 25 | 0.1888 | 0.1922 | 80.80 |
| XIII | 25 | 25 | 0.1259 | 0.2939 | 70.64 |
| XIV | 25 | 25 | 0.06294 | 0.502 | 49.85 |
| XV | 50 | 25 | 0.2517 | 0.2135 | 78.67 |
| XVI | 75 | 25 | 0.2517 | 0.2652 | 73.50 |
| XVII | 100 | 25 | 0.2517 | 0.5067 | 49.38 |
| XVIII | 75 | 25 | 0.3147 | 0.2811 | 71.91 |
| XIX | 75 | 25 | 0.1888 | 0.4003 | 60.00 |

The above results show that good extraction is obtained at all of the concentrations and volume phase ratios tested. Copper extraction increases with the concentration of the aminohydroxyalkyl extractant and decreases when the volume of the aqueous phase is increased.

The loaded organic phases of the above examples were stripped with 1.74 molar aqueous solutions of ammonium hydroxide at an organic to aqueous volume phase ratio of 1:1. The stripping was carried out in separatory funnels at ambient room temperatures. Results are set forth in the following table:

Table IV

| Exp. | Cu in Org. Phase (Mg.) | Cu Stripped (Mg.) | Percent Stripped |
|---|---|---|---|
| XI | 22.60 | 16.28 | 72 |
| XII | 20.22 | 16.88 | 83.5 |
| XIII | 17.68 | 15.3 | 86.5 |
| XIV | 12.47 | (¹) | (¹) |
| XV | 39.37 | 35.2 | 89.4 |
| XVI | 55.17 | 48.07 | 87.1 |
| XVII | 49.43 | 45.55 | 92.1 |
| XVIII | 53.98 | 48.68 | 90.2 |
| XIX | 45.05 | 41.82 | 92.8 |

¹ Not stripped.

The above data show that stripping of the loaded organic phase with aqueous ammonium hydroxide was very efficient. The last bit of copper remaining in the organic phase after stripping can be removed by treating said phase with 1 normal hydrochloric acid.

Any of the aminohydroxyalkyl compounds falling within the general formula above may be substituted for those in the examples. Representative of such compounds are:

9(10)-amino-10(9)-hydroxystearylamine
9(10)-amino-10(9)-hydroxystearic acid
9(10)-dodecylamino-10(9)-hydroxystearylamine
9(10)-(β-aminoethyl)-amino-10(9)-hydroxystearylamine
9(10)-(β-aminoethyl)-amino-10(9)-hydroxystearonitrile
9(10)-(meta-aminomethylbenzylamino)-10(9)-hydroxystearylamine
9(10)-(meta-aminomethylbenzylamino)-10(9)-hydroxystearonitrile
9(10)-(meta-aminophenylamino)-10(9)-hydroxystearylamine
9(10)-(gamma-aminopropyl)-amino-10(9)-hydroxystearylamine
9(10)-(gamma-aminopropyl)-amino-10(9)-hydroxystearyl-(gamma-aminopropyl)amine
9(10)-(gamma-aminopropyl)-amino-10(9)-hydroxypalmityl-(gamma-aminopropyl)amine
9(10)-methylamino-10(9)-hydroxystearonitrile
9(10)-amino-10(9)-hydroxy-N,N-dimethylstearamide
9(10)-ethanolamino-10(9)-hydroxy-N,N-distearylstearamide It is to be understood that the invention is not to be limited to the exact details of operation or the exact processes shown or described, as obvious modificaions and equivalents will be apparent to those skilled in the are and the invention is to be limited only by the scope of the appended claims.

The embodiments of the invention in which an exclusive property or privilege is claimed are defined as follows:

1. A process for the recovery of extractable metal values from an aqueous solution comprising: (1) contacting said aqueous solution with a water immiscible organic phase containing an aminohydroxyalkyl extractant having the formula:

$$R-\begin{bmatrix}-CH-CH-\\|\quad|\\OH\ NHR^2\end{bmatrix}$$
$$Z-R^1-$$

where Z is selected from the group consisting of

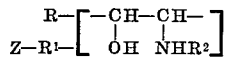

$CN$, $N\begin{smallmatrix}R^2\\\\R^3\end{smallmatrix}$, $N\bigcirc X$, $CON\begin{smallmatrix}R^2\\\\R^3\end{smallmatrix}$, $CON\bigcirc X$ and $COOR^4$ R is selected from the group consisting of hydrogen and aliphatic hydrocarbon radicals of 1 to 20 carbon atoms, $R^1$ is a divalent aliphatic hydrocarbon radical of 1 to 21 carbon atoms, $R^2$ and $R^3$ are selected from the group consisting of hydrogen, aliphatic hydrocarbon radicals, aryl radicals, hydroxyalkyl radicals and aminoalkyl radicals, $R^4$ is selected from the group consisting of hydrogen, aliphatic radicals and aryl radicals.

is a nitrogen containing heterocyclic radical and X being the residue of said radical, and the total number of carbon atoms in R and $R^1$ is in the range of 5 to 21; and (2) separating the resultant metal-pregnant organic phase from the aqueous phase.

2. A process for the recovery of extractable metal values from an aqueous solution comprising: (1) contacting said aqueous solution with a water immiscible organic phase containing an aminohydroxyalkyl compound having the formula:

$$R-\begin{bmatrix}-CH-CH-\\|\quad|\\OH\ NHR^2\end{bmatrix}$$
$$Z-R^1-$$

where Z is selected from the group consisting of

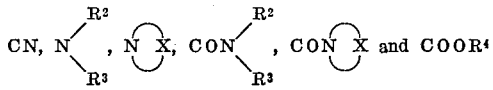

R is selected from the group consisting of hydrogen and aliphatic hydrocarbon radicals of 1 to 20 carbon atoms, $R^1$ is a divalent aliphatic hydrocarbon radical of 1 to 21 carbon atoms, $R^2$ and $R^3$ are selected from the group consisting of hydrogen, aliphatic hydrocarbon radicals, aryl radicals, hydroxyalkyl radicals and aminoalkyl radicals, $R^4$ is selected from the group consisting of hydrogen, aliphatic radicals and aryl radicals, $N\bigcirc X$ is a nitrogen containing heterocyclic radical with X being the residue of said radical, and the total number of carbon atoms in R and $R^1$ is in the range of 5 to 21, to extract said metal values into said organic phase; (2) separating the resultant metal-pregnant organic phase from the aqueous phase; (3) contacting said metal-pregnant organic phase with an aqueous stripping medium to strip the metal values from the metal-pregnant organic phase; and (4) separating the resultant metal-pregnant aqueous stripping medium from the organic phase.

3. A process as defined in claim 2 in which said aqueous solution is neutral.

4. A process as defined in claim 2 in which said aqueous solution is basic.

5. A process as defined in claim 2 in which the aqueous stripping medium is aqueous ammonium hydroxide.

6. A process as defined in claim 2 in which the organic phase contains 2 to 50 weight percent of the aminohydroxyalkyl compound and from 50 to 98 weight percent diluent.

7. A process as defined in claim 6 wherein the diluent is benzene.

8. A process as defined in claim 6 wherein the diluent is kerosene.

9. A process as defined in claim 2 wherein R and $R^1$ are aliphatic hydrocarbon radicals of 5 to 17 carbon atoms.

10. A process as defined in claim 2 wherein Z is CN.

11. A process as defined in claim 2 wherein Z is

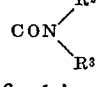

$CON\begin{smallmatrix}R^2\\\\R^3\end{smallmatrix}$

12. A process as defined in claim 2 wherein Z is

$N\begin{smallmatrix}R^2\\\\R^3\end{smallmatrix}$

13. A process as defined in claim 2 wherein the aminohydroxyalkyl compound has the formula:

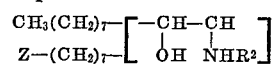

$$CH_3(CH_2)_r-\begin{bmatrix}-CH-CH\\|\quad|\\OH\ NHR^2\end{bmatrix}$$
$$Z-(CH_2)_r-$$

14. A process as defined in claim 2 wherein the aminohydroxyalkyl compound is 9(10)-amino-10(9)-hydroxystearonitrile.

15. A process as defined in claim 2 wherein the aminohydroxyalkyl compound is 9(10)-dodecylamino-10(9)-hydroxystearonitrile.

16. A process as defined in claim 2 wherein the aminohydroxyalkyl compound is 9(10)-amino-10(9)-hydroxystearamide.

17. The process of claim 2 wherein the extractable metal values are copper values.

No references cited.

CARL D. QUARFORTH, *Primary Examiner.*

UNITED STATES PATENT OFFICE
CERTIFICATE OF CORRECTION

Patent No. 3,197,274                                          July 27, 1965

James M. White

It is hereby certified that error appears in the above numbered patent requiring correction and that the said Letters Patent should read as corrected below.

Column 1, line 41, strike out "and" and insert instead a comma; line 42, before "aminoalkyl" strike out the comma, and insert instead -- and --; column 2, line 15, for "of", second occurrence, read -- or --; column 3, lines 18 to 20, the formula should appear as shown below instead of as in the patent:

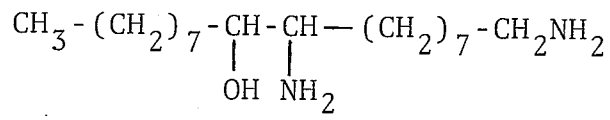

lines 28 to 30, the formula should appear as shown below instead of as in the patent:

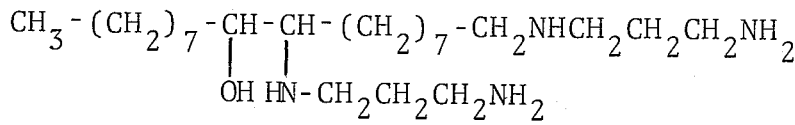

column 4, line 18, for "Ssubstituted" read -- Substituted --; column 7, line 30, for "are" read -- art --.

Signed and sealed this 12th day of April 1966.

(SEAL)
Attest:

ERNEST W. SWIDER                                  EDWARD J. BRENNER
Attesting Officer                               Commissioner of Patents

UNITED STATES PATENT OFFICE
CERTIFICATE OF CORRECTION

Patent No. 3,197,274                                                July 27, 1965

James M. White

It is hereby certified that error appears in the above numbered patent requiring correction and that the said Letters Patent should read as corrected below.

Column 1, line 41, strike out "and" and insert instead a comma; line 42, before "aminoalkyl" strike out the comma, and insert instead -- and --; column 2, line 15, for "of", second occurrence, read -- or --; column 3, lines 18 to 20, the formula should appear as shown below instead of as in the patent:

lines 28 to 30, the formula should appear as shown below instead of as in the patent:

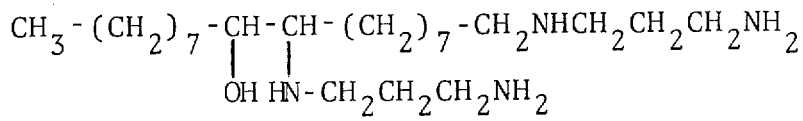

column 4, line 18, for "Ssubstituted" read -- Substituted --; column 7, line 30, for "are" read -- art --.

Signed and sealed this 12th day of April 1966.

(SEAL)
Attest:

ERNEST W. SWIDER                                    EDWARD J. BRENNER
Attesting Officer                                     Commissioner of Patents